United States Patent [19]

Colonel

[11] Patent Number: 4,530,665
[45] Date of Patent: Jul. 23, 1985

[54] METHOD FOR STITCHING PATTERN

[76] Inventor: Shirley R. Colonel, Box 11, Site 21, R.R. #1, Creston, British Columbia, Canada, V0B 1G0

[21] Appl. No.: 468,387

[22] Filed: Feb. 22, 1983

[51] Int. Cl.³ .................. G09B 19/20; D05C 17/00
[52] U.S. Cl. ............................... 434/95; 112/266.1; 112/439
[58] Field of Search .............. 434/95; 112/439, 266.1

[56] References Cited

U.S. PATENT DOCUMENTS

| | | |
|---|---|---|
| 1,560,283 | 11/1925 | Mehlem . |
| 1,887,364 | 11/1932 | Shillman . |
| 2,157,573 | 5/1939 | Sadtler . |
| 3,269,032 | 8/1966 | Sumner . |
| 3,741,468 | 6/1973 | Servillat . |
| 4,127,191 | 11/1978 | Cave .................. 434/95 X |
| 4,259,784 | 4/1981 | MacPherson . |
| 4,310,313 | 1/1982 | Brundige . |
| 4,465,007 | 8/1984 | Strobel ................. 112/439 |

Primary Examiner—William H. Grieb
Attorney, Agent, or Firm—Wegner & Bretschneider

[57] ABSTRACT

A method of stitching a pattern on fabric employing a piece of interwoven netting having rows of square holes and the desired pattern printed thereon. The netting is attached to the fabric so that the pattern on the netting directly overlies the area on the fabric where the pattern is to be reproduced. The pattern is then stitched onto the fabric using a needle and embroidery threads. The stitch that is used is a cross-stitch wherein the thread is pushed up from the inside surface of the fabric and through the center of a hole in one row of the netting and then crossed over an intersection of the netting on a 45° angle to the threads forming the netting. The thread is then pulled down through a hole in an adjacent row and through the fabric. Upon completion of the stitched pattern, the netting is removed by drawing out the threads thereof one strand at a time. A kit is also provided to enable one to carry out this method.

16 Claims, 6 Drawing Figures

METHOD FOR STITCHING PATTERN

BACKGROUND OF THE INVENTION

This invention relates to a method of stitching a pattern, particularly a multi-colored pattern, on a fabric and also to a kit for carrying out this method.

Do it yourself needlepoint kits employing a printed design on a canvas-like material are known. One such kit is sold under the trade mark CREATIQUE by Dufferin Enterprises of Grand Valley Limited. The kit includes wool yarn, a sheet of cotton canvas having a design printed thereon and a tapestry needle. The canvas used in this kit is of the interlocking type and accordingly it is not possible to remove the individual threads from the remainder of the canvas by pulling on the individual threads. With this kit it is intended that the pattern be permanently placed on the canvas material provided and it is not possible to place the pattern on a separate piece of fabric unless the canvas is left permanently in place over the fabric after the pattern has been stitched. The recommended stitch for this kit is a half-cross stitch wherein the needle is inserted from the back of the canvas through to the front of the canvas and the thread is then crossed over an adjacent intersection at a 45° angle and then passed through the opening in the adjacent row. The stitch moves from left to right on the material until the end of the region for the color of the thread being employed is reached. The embroiderer then stitches from right to left in the next row over. It should further be noted that the canvas of this kit employs pairs of closely adjacent parallel threads between the rows of square holes. In other words the rows of square holes are not separated by single threads either in the longitudinal or transverse direction.

In addition to the type of canvas used in the CREATIQUE kit discussed above, it is also known to provide an open type of canvas having rows of holes both in the longitudinal and in the vertical direction that are separated by single threads. A design may be printed on this type of canvas. Again however the canvas is of the interlocking type and it is therefore not possible to readily separate individual threads from the remainder of the canvas. One particular kit employing this type of canvas is sold under the trade mark JIFFY NEEDLEPOINT by Sunset Designs, 3401 Crow Canyon Road, San Ramon, Calif., U.S.A.

Early U.S. Pat. No. 1,560,283 issued Nov. 3, 1925 to E. B. Mehlem describes a customary procedure for the embroidery of designs on netting and the like. A sheet of fabric is stamped with the desired design and the embroidery threads are passed through both the netting and the fabric. The fabric is then cut from the embroidery along the edge of the latter. The patent discusses several problems with this known procedure including the danger of cutting the netting when the embroidered design is being cut from the fabric. The particular method disclosed and claimed in the patent employs a sheet of paper that has a pattern thereon formed by openings cut in the sheet. Glued to the back of the paper sheet is a layer of fabric having a color contrasting with that of the paper sheet. A netting to be embroidered is placed upon the pattern sheet and the pattern can be readily seen through this netting. The disclosed method permits the pattern to be used repeatedly.

U.S. Pat. No. 1,887,364 describes a method of producing a pattern on an article such as a pillow case. Designs are stamped on the outer surfaces of both top and bottom panels forming the pillow case. The design must have a sufficiently heavy imprint so as to be visible upon the inner surface of the panel. The embroidery work is applied in accordance with the design to the inner surface of the panel.

Recent U.S. Pat. No. 4,310,313 issued Jan. 12, 1982 to M. K. Brundige teaches a kit for working needlepoint that employs an open weave canvas having horizontal and vertical rows of intersecting strands forming a grid with spaces defined therebetween. The canvas must be specially marked and these markings include a vertical line bisecting the interior of the defined perimeter into two sections and a horizontal line bisecting the interior of the defined perimeter into two sections. A graph type chart sheet having horizontal and vertical grid lines is also employed. The canvas that forms part of the kit does not appear to be of any special type. A button hole stitch is employed with this kit.

It is an object of the present invention to provide a method of stitching a pattern on fabric which permits the pattern to be stitched onto the fabric in a quick and easy manner without prior training and without a high degree of needleworking skill.

It is a further object of the present invention to provide a method of stitching a pattern which can be employed with any type of fabric including a knitted fabric, velvet, and suede.

It is another object of the present invention to provide a method of stitching a pattern on fabric which employs the use of netting having the desired pattern printed thereon but which permits the netting material to be removed and disposed of after the pattern has been stitched onto the desired fabric.

SUMMARY OF THE INVENTION

According to one aspect of the invention a method of stitching a pattern on fabric comprises providing a piece of interwoven netting having rows of square holes and a desired pattern printed thereon and fabric on which the pattern is to be stitched. The netting is attached to the fabric so that the pattern on the netting directly overlies the area on the fabric where the pattern is to be reproduced. The pattern is stitched onto the fabric using a needle and threads and a cross-stitch. The thread on each stitch is pushed up from the inside surface of the fabric and through the center of a hole in one row of the netting and then is crossed over an intersection of the netting on an angle to the threads forming the netting. The thread is then drawn down through a hole in a row adjacent said one row and through the fabric. Upon completion of the stitched pattern the netting is removed by drawing out the threads thereof one thread at a time.

Preferably the interwoven netting is interwoven white mono-canvas having approximately eight to sixteen holes per inch both in the longitudinal and transverse directions. Interwoven beige mono-canvas could also be used. The most preferred netting used by the applicant has approximately twelve holes per inch. The preferred threads used for stitching are three strand embroidery threads which can be made by splitting embroidery threads having six strands.

According to another aspect of the invention, a pattern stitching kit to provide the means to reproduce a multi-colored pattern on a piece of fabric or clothing by cross-stitching threads across the area of the fabric or clothing where the pattern is to be placed is provided. The kit comprises a sheet of interwoven netting having rows of square holes and a multi-colored pattern printed thereon. In addition sufficient embroidery threads of different colors are provided to reproduce the pattern printed on the sheet. The colors of the threads correspond to the colors of the printed pattern on the netting. Preferably the kit also includes a stitching needle.

DETAILED DESCRIPTION OF PREFERRED EMBODIMENT

The method of the invention for stitching a pattern on fabric employs a piece of interwoven netting 10. This netting consists of a series of parallel longitudinal threads 12 and a series of parallel transverse threads 13. These interwoven threads form a grid with square holes defined between the threads. In the preferred netting employed by the applicant there are approximately twelve holes per inch both in the longitudinal and transverse directions. The preferred threads are made of cotton and are quite strong. One type of netting particularly preferred by the applicant is called interwoven white mono-canvas which can be purchased from S. R. Kertzer & Company Limited, 257 Adelaide Street West, Toronto, Ontario, Canada M5H 1Y1. This white mono-canvas is also available in the United States from Joan Toggitt Limited, 246 Fifth Avenue, New York, N.Y. 10001, U.S.A. Unlike interlocking netting used by many manufacturers of needlepoint kits, the individual threads can be pulled from interwoven netting by pulling on the end of the thread in the longitudinal direction relative to the thread itself. This provides a considerable advantage when the method of the present invention is employed as will be explained hereinafter.

Figure 1:
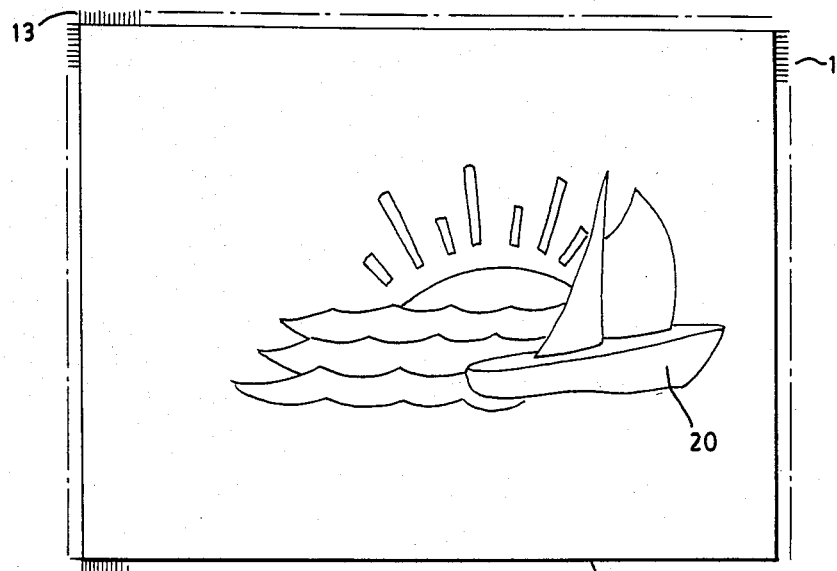
FIG. 1 is a front view of a piece of interwoven netting having a pattern printed thereon.

As shown in FIG. 1 the interwoven netting has a pattern printed on the front side thereof. This pattern 20 is preferably a multi-colored pattern and it is applied to the netting in the same manner as patterns have been applied in the past to other types of netting and canvas. As far as the applicant is aware however patterns have never been printed on interwoven netting in the past for the purpose of providing a pattern that is to be stitched onto a piece of fabric or clothing.

Although the use of colors printed directly on the netting is preferred, other means could be employed to indicate to the user which color of thread is to be used at any given location on the pattern. For example a separate color graph could be provided with the netting. It might indicate that X marks on the pattern represent the color green while dash lines represent the color yellow. The X marks and dash lines are then printed on the netting in the regions where threads of these two colors are to be employed. Alternatively the pattern printed on the netting could be a simple black outline pattern that marks the boundaries of the various color regions. A colored picture can be provided to indicate which color of thread is applied to each region. However it is felt that printing the colors directly on the netting is preferred by most users of these kits because it is easier to determine the color to be used and mistakes are therefore less likely to occur.

Figure 2:
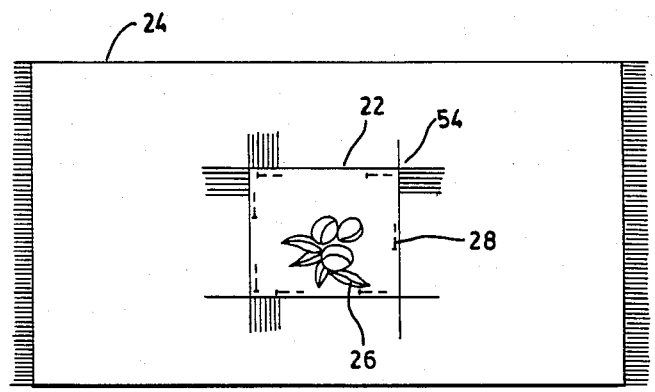
FIG. 2 is a front view of a piece of fabric to which has been attached a piece of netting having a pattern printed thereon.

In FIG. 2 a piece of interwoven netting 22 is shown affixed to a piece of fabric 24. The illustrated piece of fabric 24 might, for example, be intended for use as a placemat. The netting 22 is attached to the fabric with the pattern 26 exposed. The netting can be attached by means of needles 28 inserted through both the netting and the fabric 24. The needles are spaced around the outside of the pattern 26. The fabric piece should be laid out on a table or other working surface so that it is smooth and taut before the pins are secured in place. If the fabric 24 on which the pattern is to be placed is a fine material such as silk or satin, large thick pins should not be used. If the pattern is to be stitched onto an item of clothing, after pinning, it is preferable to try the garment on so as to ensure that the pattern is placed exactly where desired for sake of appearance. If a large pattern is being used, the work piece can be rolled to make it easier to hold while the pattern is being stitched.

Figure 5:
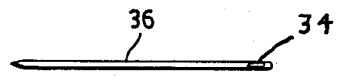
FIG. 5 is a view of a needle that can be employed with the present method.
Figure 6:
FIG. 6 is a view of a six strand embroidery thread that can be provided with the kit of the present invention.

A piece of interwoven netting such as that shown in FIG. 1 can be sold as part of a kit that includes sufficient embroidery threads 30 of different colors to reproduce the pattern printed on the sheet 10. The colors of the threads 30 in the kit are matched to the colors of the particular pattern printed on the netting. There may be a slight shade variation between the color of the thread and the matching color on the netting due to the pattern printing process but it should be clear to the purchaser of the kit when a thread of the correct color is being used. Embroidery thread for needlework often comprises six strands and a thread of this type is shown in FIG. 6 wherein the strands at the end 32 have been separated. In the preferred method of the present invention, a three strand embroidery thread is used. To provide the necessary three strand thread, a standard six strand thread can be split in half to produce two lengths of thread having three strands each. One of the threads of three strands is threaded through the hole 34 of a suitable needle 36. FIG. 5 illustrates the approximate actual size of the preferred needle 36. To complete the threading operation, a small knot is tied in the end of the working thread. It will be appreciated that threads having more than three strands could be employed in the method of the present invention but the interwoven netting would then have to have sufficiently large openings to accommodate the larger size of thread. For example, the standard six strand thread could be employed for stitching without any splitting but the netting would then have to have holes large enough for this size of thread.

Figure 3:
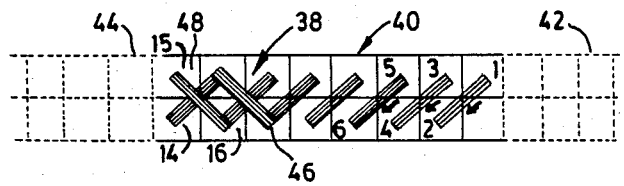
FIG. 3 is a schematic illustration showing the method of stitching employed in the present invention.

FIG. 3 illustrates the type of stitch used in the method of the present invention. The stitch is a type of cross stitch. FIG. 3 shows two adjacent rows of square holes 38 in the interwoven netting. Furthermore three different colors are illustrated by the type of line used to illustrate the threads of the netting in FIG. 3. The solid line at 40 indicates the color blue printed on the netting, while the dashed line 42 indicates the color green. Finally the dotted line 44 on the left side of FIG. 3 indicates the color red. A blue thread 46 is shown partially stitched across one row extending from one side of the blue color of the pattern to the other side. To begin cross stitching, a needle threaded with blue colored thread is pushed up from the inside surface of the fabric (sometimes called the wrong side) through the center of a square indicated at 1 in FIG. 3. The thread is then crossed over the first matched colored intersection of the netting on a 45° angle and then drawn down through the next lower square located at 2. This square is in a row adjacent the row containing square 1. The small arrows indicate the direction in which the thread is drawn by the needle. This process is then repeated by again pushing the needle up from the inside of the fabric through the center of square 3. The stitch is repeated until you have stitched the last intersection in the row that is colored the same as the thread being used. This intersection is indicated at 48 in FIG. 3. The artist then works back along the same row with the first step involving pushing the needle up from the inside surface through the fabric and through the center of square 15. The needle is then crossed over intersection 48 on an angle and drawn down through the center of the next lower square 16. It will be seen from FIG. 3 that crosses are then formed and this is how the stitch gets its name. Only two complete cross stitches are shown in FIG. 3 with five more to be completed in the row. Care must be taken to ensure that the needle does not pierce the threads of the interwoven netting but passes only through the holes 38. The reason for this is that the individual threads of the netting must later be removed as explained hereinafter.

Figure 4:
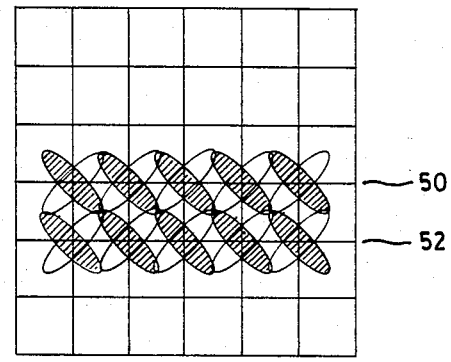
FIG. 4 is a schematic illustration showing the proper way of stitching one row after another.

FIG. 4 illustrates how one proceeds after the completion of a complete row 50 of cross stitches. The artist should work across the pattern in rows, completing each row before starting another, even if only one cross exists in a row. The artist generally should not work up and down the pattern although this is possible. If the artist does work up and down, the resulting work is not as neat as it would be otherwise. After one row has been completed the artist begins to stitch the immediately adjacent row 52 again working from right to left in the case of a right-handed person. If the artist is left-handed, it is recommended that he or she work from left to right on the pattern. It is further recommended that an area of a single color be completely filled in before the artist goes on to another color. To prevent any puckering of the material, it is recommended that a color in the middle of the pattern be cross stitched first. The artist should then work outwardly from the center as each color is completed. This procedure is particularly desirable when working on T-shirt material and knits. As the pattern is filled in, the inside surface of the fabric should be checked regularly in order to prevent puckering. The fabric should be smoothed and repinned when necessary as this helps to eliminate shifting which in turn causes puckering.

After the pattern has been completely stitched onto the fabric, it is then desirable to remove the netting material as much of this material will be left exposed. Because interwoven netting has been used together with the special cross stitches described, it is possible to remove the threads of the netting by drawing them out one thread at a time. This process is commenced along one of the outside borders of the netting first, such as at 54. Each thread can be drawn out by hand by pulling on the end of the thread in the longitudinal direction thereof. The work should be held firmly in one hand as the strands are removed. The worker should be able to feel the individual threads slide easily between his or her fingers from under the crosses when the work is being held properly. The thread should not be pulled upwardly at a 45° angle to the surface of the workpiece as this will place stress on the cross-stitches and also may cause the netting strands to break.

If the worker is not strong enough to remove the individual threads by pulling on them with his or her fingers, a pair of pliers will work quite well.

After the netting has been removed either by hand or with the use of pliers, the fabric with the pattern stitched thereon should be steam ironed on the inside surface, preferably on a soft surface such as that provided by an ironing board. It is also recommended that, during this stitching process, when each thread has been stitched onto the fabric, the end of the thread should be slip knotted to secure it and the remaining portion cut off. Knotting the work will of course prevent the stitches from coming apart.

It will be appreciated that various modifications and changes could be made to the method and kit of the present invention by one skilled in this art without departing from the spirit and scope of this invention for example various types of interwoven netting could be used provided it has sufficiently large openings to permit the passage of a stitching needle and provided the strands can be readily removed after stitching has been completed.

What I claim as my invention is:

1. A method of stitching a pattern on fabric comprising providing a piece of interwoven netting having rows of square holes and the desired pattern printed thereon and fabric on which said pattern is to be stitched, attaching said netting to said fabric so that the pattern on the netting directly overlies the area on said fabric where the pattern is to be reproduced, stitching the pattern onto the fabric using a needle and threads and a cross-stitch, the thread on each stitch being pushed up from the inside surface of said fabric and through the center of a hole in one row of said netting, then being crossed over an intersection of said netting on an angle to the threads forming said netting, and then being drawn down through a hole in a row adjacent said one row and through said fabric, and upon completion of the stitched pattern removing the netting by drawing out the threads thereof one thread at a time.

2. A method of stitching a pattern according to claim 1 wherein said interwoven netting is interwoven white or beige mono-canvas.

3. A method of stitching a pattern according to claim 2 wherein said netting has approximately eight to sixteen holes per inch both in the longitudinal and transverse directions.

4. A method of stitching a pattern according to claim 1 wherein the threads used for stitching are three strand embroidery threads.

5. A method of stitching a pattern according to claim 1 wherein said stitching is carried out by working across the pattern to the end of the color that matches the thread being used and then returning by cross-stitching back in the same row.

6. A method of stitching a pattern according to claim 1 wherein each thread of the netting is drawn out by pulling longitudinally on the end of the netting thread.

7. A method of stitching a pattern according to claim 1 wherein the pattern printed on said netting is colored several different colors according to the desired colors for the pattern to be stitched on said fabric.

8. A method according to claim 7 wherein the pattern is stitched by completely filling in one color at a location where said one color is required before stitching with a thread of a different color.

9. A pattern stitching kit to provide the means to reproduce a multicolored pattern on a piece of fabric or clothing by cross-stitching threads across the area of said fabric or clothing where said pattern is to be placed, said kit comprising a sheet of interwoven netting for temporary application to the piece of fabric or clothing, having rows of square holes and a pattern printed thereon, means to indicate to the user which color of thread is to be used at any location on the pattern and sufficient embroidery threads of different colors to reproduce the pattern printed on said sheet in accordance with said indicating means.

10. A pattern stitching kit according to claim 9 wherein said netting is interwoven white or beige mono-canvas.

11. A pattern stitching kit according to claim 9 wherein said netting has approximately eight to sixteen holes per inch both in the longitudinal and transverse directions.

12. A pattern stitching kit according to claim 11 wherein said netting has approximately twelve holes per inch in the longitudinal and transverse directions.

13. A pattern stitching kit according to claim 11 wherein the threads each have at least three strands.

14. A pattern stitching kit according to claim 9 including a stitching needle.

15. A pattern stitching kit according to claim 9 including a piece of fabric to which the pattern is to be applied.

16. A pattern stitching kit according to claim 9, wherein said indicating means comprising colors printed on the netting and corresponding to the colors of the threads to be used.

* * * * *